United States Patent
Mayer

(10) Patent No.: US 9,352,736 B2
(45) Date of Patent: May 31, 2016

(54) MONITOR FOR BRAKE ACTUATOR PRESSURE AND METHOD FOR MONITORING BRAKE ACTUATOR PRESSURE

(71) Applicant: KNORR-BREMSE SYSTEME FÜR SCHIENENFAHRZEUGE GMBH, Munich (DE)

(72) Inventor: Reinhold Mayer, Karlsfeld (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 40 days.

(21) Appl. No.: 14/383,445

(22) PCT Filed: Mar. 8, 2013

(86) PCT No.: PCT/EP2013/000689
§ 371 (c)(1),
(2) Date: Sep. 5, 2014

(87) PCT Pub. No.: WO2013/131654
PCT Pub. Date: Sep. 12, 2013

(65) Prior Publication Data
US 2015/0057849 A1    Feb. 26, 2015

(30) Foreign Application Priority Data

Mar. 9, 2012 (DE) .................. 10 2012 004 892

(51) Int. Cl.
| | |
|---|---|
| *B60T 17/22* | (2006.01) |
| *G01L 5/28* | (2006.01) |
| *G01M 17/08* | (2006.01) |
| *B60T 13/66* | (2006.01) |

(52) U.S. Cl.
CPC ............. *B60T 17/228* (2013.01); *B60T 13/665* (2013.01); *G01L 5/28* (2013.01); *G01M 17/08* (2013.01)

(58) Field of Classification Search
CPC ....... B60T 13/665; B60T 13/66; B60T 13/68; B60T 13/70; B60T 13/745; B60T 17/22; B60T 17/221; B60T 17/226; B60T 17/228; B60T 15/025; B60T 15/027; B60T 15/028; B60T 15/021; B60T 15/048; B60T 15/184; B60T 2270/88; F15B 19/00; F15B 19/005; F15B 2201/51; G01M 17/08; G01L 5/28; B61H 13/00
USPC ................. 701/70, 71, 78, 83, 19; 303/113.1, 303/118.1
See application file for complete search history.

(56) References Cited

U.S. PATENT DOCUMENTS

| | | | | |
|---|---|---|---|---|
| 4,538,228 A | * | 8/1985 | Brearey | ................ B60T 8/1705 303/122.09 |
| 5,788,337 A | * | 8/1998 | Eckert | ..................... B60T 8/172 303/11 |

(Continued)

FOREIGN PATENT DOCUMENTS

| | | |
|---|---|---|
| CN | 102143868 A | 8/2011 |
| DE | 4312404 A1 | 10/1994 |

(Continued)

OTHER PUBLICATIONS

Search Report for International Patent Application No. PCT/EP2013/000689; Aug. 16, 2013.

(Continued)

*Primary Examiner* — Thomas G Black
*Assistant Examiner* — Sara Lewandroski
(74) *Attorney, Agent, or Firm* — Barnes & Thornburg LLP

(57) ABSTRACT

A monitor for a brake apparatus of a railway vehicle, wherein the brake apparatus has at least one pressure-actuated brake actuator, upstream of which a control valve device is provided. The monitor performs an estimation of the actuator pressure applied at the brake actuator on the basis of pressure data and actuation data, the pressure data represents at least one pressure present upstream of the control valve device and the actuation data represents an actuation of the control valve device. Further disclosed is a corresponding brake apparatus for a railway vehicle, a railway vehicle and a method for estimating an actuator pressure.

10 Claims, 4 Drawing Sheets

(56) References Cited

U.S. PATENT DOCUMENTS

| | | | | |
|---|---|---|---|---|
| 5,951,119 | A * | 9/1999 | Eckert | B60T 8/4854 |
| | | | | 188/356 |
| 2005/0121974 | A1 * | 6/2005 | Buschmann | B60T 8/409 |
| | | | | 303/122.09 |
| 2007/0290550 | A1 * | 12/2007 | Knornschild | B60T 13/665 |
| | | | | 303/3 |
| 2009/0210127 | A1 * | 8/2009 | Crepin | B60T 8/36 |
| | | | | 701/75 |
| 2013/0134768 | A1 * | 5/2013 | Ito | B60L 3/0092 |
| | | | | 303/3 |

FOREIGN PATENT DOCUMENTS

| | | | |
|---|---|---|---|
| DE | 19514382 | A1 | 10/1996 |
| DE | 19737779 | A1 | 3/1999 |
| DE | 19848992 | A1 | 5/2000 |
| DE | 102008045712 | A1 | 4/2011 |
| EP | 1291259 | A2 | 3/2003 |

OTHER PUBLICATIONS

Notification Concerning Transmittal of International Preliminary Report on Patentability and Written Opinion of the International Searching Authority for International Patent Application No. PCT/EP2013/000689, dated Mar. 8, 2013.

English Translation of Notification Concerning Transmittal of International Preliminary Report on Patentability and Written Opinion of the International Search Authority for International Patent Application No. PCT/EP2013/000689, dated Mar. 8, 2013.

Chinese Office Action dated Jan. 5, 2016.

* cited by examiner

MONITOR FOR BRAKE ACTUATOR PRESSURE AND METHOD FOR MONITORING BRAKE ACTUATOR PRESSURE

PRIORITY CLAIM

This patent application is a U.S. National Phase of International Patent Application No. PCT/EP2013/000689, filed 8 Mar. 2013, which claims priority to German Patent Application No. 10 2012 004 892.0, filed 9 Mar. 2012, the disclosures of which are incorporated herein by reference in their entirety.

FIELD

Disclosed embodiments relate to a monitor for a brake device of a railway vehicle, which estimates an actuator pressure applied to a pressure-actuated brake actuator. Disclosed embodiments also relate to a corresponding method and a brake device for a railway vehicle having a corresponding monitor and a corresponding railway vehicle.

SUMMARY

Pressure-actuated brake devices such as pneumatic or hydraulic brakes are frequently used in railway vehicles. Such brakes generally have pressure-actuated brake actuators such as brake cylinders, which can generate a braking action on the railway vehicle upon application of a pressure. The applied pressure in the brake actuator is of great significance for the generated braking action in this case. For the precise activation of a brake system, it is therefore advantageous to know this pressure as precisely as possible. However, it is costly and complex to provide each individual brake actuator or brake cylinder with a pressure sensor.

Disclosed embodiments enable the determination or estimation of a pressure in a brake actuator such as a brake cylinder in a simple and cost-effective manner.

BRIEF DESCRIPTION OF THE FIGURES

The invention will now be explained as an example with reference to the appended drawings on the basis of disclosed embodiments.

DETAILED DESCRIPTION OF THE DISCLOSED EMBODIMENTS

Figure 1:
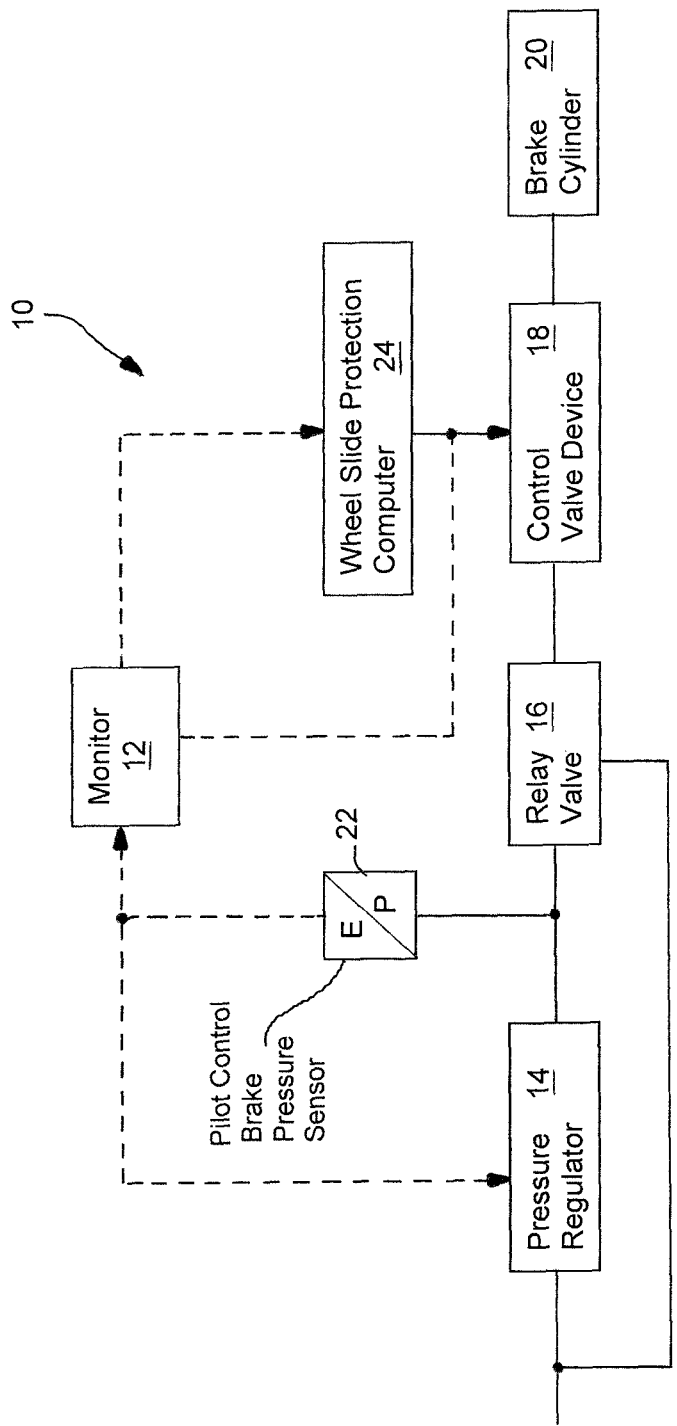
FIG. 1 schematically shows an example of a brake device having a monitor, which estimates an actuator pressure.

In the disclosed embodiments, a railway vehicle can be any type of rail-bound vehicle, for example, a vehicle having hard wheels such as steel wheels or a vehicle having gas-filled tires, which travel on a rail. A railway vehicle can have one or more carriages, in particular towing carriages and/or rail carriages and/or non-driven carriages. A brake device can be in particular a friction brake device, which is capable of braking a railway vehicle and/or one or more wheels of the railway vehicle by way of a friction contact. A pressure-actuated brake actuator can be provided as part of the brake device. Such a pressure-actuated brake actuator can in general be implemented for the purpose of converting a pressure applied and/or acting thereon into an actuating force for actuating a brake device, in particular for actuating a friction brake device. A friction brake device can in general refer to, for example, a disk brake, a block brake, or a combined block-disk brake. A brake actuator can be in particular a brake cylinder, which is capable of converting a pneumatic or hydraulic pressure into an actuating force. A pressure which is active for actuating a brake actuator and/or a pressure which is applied to the brake actuator can be referred to as an actuator pressure. A control device can in general be an electronic control device. It is conceivable that a control device consists of one or more components which can be in data communication with one another. A control device can be in particular a brake control device, which is capable of activating at least one brake device of a railway vehicle and/or one carriage of the railway vehicle. In particular, a control device can be implemented for the purpose of activating a brake device in accordance with a braking request. In general, data can represent specific values or dimensions. In this case, data which represent a value or a dimension can directly correspond to the value or the dimension and/or can specify it, or it can be provided that the value or the dimension may be calculated from the data. Thus, for example, pressure data can represent a pressure in such a manner that they directly specify the value of a pressure or the pressure may be calculated therefrom. Activation data can represent in particular an activation of a device. In this case, activation data can represent signals for activating a device, for example, which are supplied to the device. Such signals can be electrical signals in particular. It is also conceivable that activation data represent a measured activation state of a device, for example, a switch setting of a valve device. Data can in general refer to data from a sensor device, which can specify a switching state of a device, for example, such as a valve device. Data can also be calculated or generated by a control device. It is conceivable that data represent dimensions and values from multiple sources, for example, from multiple different sensors and/or control devices. Thus, for example, activation data can comprise both signals for activating a device such as a control valve device and also sensor data, which specify the state of the device achieved by the activation. The registration of data by a device can refer, for example, to the reception and/or recording and/or readout of data. It is conceivable in this case that a device inputs data via a suitable interface to register them. A control valve device can in general be implemented for the purpose of setting or controlling a fluid supply and/or a provided pressure. A control valve device can in this case be pneumatically or hydraulically activatable in accordance with a control pressure and/or can be electrically activatable. A control valve device can in general have one or more valves, for example, pilot control valves and/or pneumatically activatable valves and/or electrically activatable valves such as solenoid valves. A brake device can be a pressure-actuated brake device such as a hydraulic or pneumatic brake device. It is conceivable that a brake device has a main control valve device. The main control valve device can be activatable by a control device, for example, by a brake control device in such a manner that it is capable of converting a braking request into a main brake pressure, which can be supplied to one or more control valve devices. In this case, the main brake pressure and/or an actuator pressure can be modifiable via a control valve device. For example, it can be provided that a control valve device is implemented for the purpose of setting a pressure in accordance with a control device, for example, a wheel slide protection computer. Thus, for example, the control valve device can be implemented for the purpose of relaying a main brake pressure directly to a pressure-actuated brake actuator in the event of a corresponding activation, so that the main brake pressure acts as the actuator pressure. In the event of another activation, the control valve device can be capable of reducing the actuator pressure. The control valve device can be implemented for the purpose, for example, in the event of corresponding activation, of establishing a fluid connection between a brake actuator and a fluid outlet to a reservoir or to the atmosphere, to reduce an actuator pressure. In general, a control valve device can have at least one input, one output, and one fluid outlet. The input can be connected or connectable in a fluid-conducting manner to a pressure supply such as a main control valve device, for example. The output can be connected or connectable in a fluid-conducting manner to a brake actuator. It is conceivable that the fluid outlet is connected or connectable to a fluid reservoir or the atmosphere. The control valve device can be switchable in particular in this case at least between one first switch setting and one second switch setting. In the first switch setting, a fluid-conducting connection can exist between the input and the output of the control valve device, while the fluid outlet is blocked. In the second switch setting, a fluid-conducting connection can exist between the fluid outlet and the output, wherein the input is blocked. The second switch setting can be considered to be an actuated setting, which can be activatable in particular as a wheel slide protection measure. A separate control device can be provided for activating the control valve device. However, it is also conceivable that the control valve device is alternatively or additionally activatable by a control device, which is capable of estimating an actuator pressure. The estimation of a pressure can comprise in particular various mathematical calculations, to provide an estimation for a value or a dimension from provided data. The estimation can be performed independently of a measurement of the value to be estimated or the dimension to be estimated. An estimation can result in one or more estimated values, which specify a value to be expected or estimated for a dimension. In general, a main control valve device can have a pressure regulator, which is capable of providing a main brake pressure or a pilot control brake pressure according to a braking request. Furthermore, a main control valve device can have a pressure converter and/or a pressure booster, which is capable of converting and/or boosting a pilot control brake pressure to a greater fluid volume. The main control valve device can comprise in this case in particular pilot control valves and/or pneumatically activatable valves and/or electrically activatable valves. It can be expedient if the main control valve device is activatable electrically and/or electro-hydraulically and/or electro-pneumatically. It is conceivable that the main control valve device has a solely pressure-actuated fallback level, to enable braking in the event that the control electronics have failed. The terms "upstream", "downstream", "connected upstream", and "connected downstream" with reference to fluid-conducting connected components refer to a fluid flow direction from a pressure source to a brake actuator.

According to the disclosed embodiments, a monitor for a brake device of a railway vehicle is provided, wherein the brake device comprises at least one pressure-actuated brake actuator, from which a control valve device is connected upstream. The monitor is implemented for the purpose of carrying out an estimation of the actuator pressure applied to the brake actuator based on pressure data and activation data. In this case, the pressure data represent at least one pressure present upstream of the control valve device and the activation data represent an activation of the control valve device. Therefore, an estimation of the actuator pressure applied to the brake actuator can be performed, whereby a separate sensor for the brake actuator can be saved. In particular, without great expenditure, already existing signals or data can be used for estimating the actuator pressure. However, it can also be provided that an estimation for a brake actuator is performed, for which a pressure sensor is provided for monitoring the actuator pressure applied thereto. Thus, for example, a plausibility check of the measurement results of the pressure sensor of the brake actuator and/or the estimation and/or the pressure data or activation data can be performed. The monitor can be implemented to receive and/or register and/or determine the pressure data and/or activation data. A monitor can be implemented in general as software, hardware, or a combination thereof. In particular, the monitor can be implemented as software, which is executable on a control device. Correspondingly, a monitor can be stored on a storage medium readable by a control device. A control device, which is implemented for the purpose of carrying out the functions of the monitor, can also be considered to be a monitor. Therefore, the monitor can be in particular a control device. It is conceivable that the monitor is implemented for the purpose of estimating a time curve of an actuator pressure, in particular during a braking operation and/or during a wheel slide protection measure. It can be provided that the monitor is implemented for the purpose of ascertaining and/or calculating an initial value for the estimation of the actuator pressure based on the pressure data. Proceeding from such an initial value, the chronological change of the actuator pressure, and/or estimations may be ascertained, which in turn enables the estimation of the actuator pressure also at points in time at which the pressure represented by the pressure data does not act directly on the actuator. The estimation of the actuator pressure applied to the brake actuator can be performed based on a model of the control valve device. Such a model can be stored in a storage device of the monitor or a control device, for example. The model can be based on experimentally ascertained properties of the control valve device and/or theoretical considerations and/or simulations in the control valve device. The model can be stored in tabular form or in another suitable form. It is conceivable in particular that the model describes a time curve of fluid flows and/or pressures inside and in the region of the control valve device based on specific activations and/or pressures. The region of the control valve device can comprise in this case, in addition to the actual control valve device, in particular a fluid connection to the brake actuator and/or the brake actuator. Thus, the model can describe in particular the time curve of an actuator pressure or a pressure at the output connected to the actuator when the control device connects the output to a fluid outlet and disconnects its input from the output. In such a switch setting of the control valve assembly, in particular the brake actuator can be disconnected from a pressure supply, which can provide a main brake pressure and/or input pressure, for example. This switch setting can occur, for example, when a wheel slide protection measure is carried out. The actuator pressure will then dissipate based on the flow properties of the control valve device. The monitor can expediently be implemented for the purpose of estimating the actuator pressure and/or the time curve of the actuator pressure in particular in such a switch setting of the control valve device. If the control valve device is then moved into a setting in which the input is again connected to the output and the fluid outlet is blocked, a good estimation of the actuator pressure is then available. If the input of the control valve device is connected to the output and the fluid outlet is blocked, in general it can be presumed that the actuator pressure follows the input pressure applied to the input of the control valve device, for example, a main brake pressure. The model can accordingly set the input pressure equal to the actuator pressure in the case of a corresponding activation of the control valve device. The setting of the actuator pressure to the input pressure is performed with a certain time delay, however, which can result in an uncertainty in the case of the brake control. By way of the estimation of the actuator pressure, in particular during this delay, an improved activation of the brake device can be provided in particular in the event of interruption and/or after ending a wheel slide protection measure. It is conceivable that the monitor is implemented for the purpose, in the event of switching of the control valve device into a non-actuated state, in which the input is connected to the output, of taking into consideration a pressure difference between the pressure at the input of the control valve device and the estimated actuator pressure at the switching point in time, to carry out an estimation of the actuator pressure in particular during a phase in which the actuator pressure is set to the input pressure and/or main brake pressure. An estimated actuator pressure at the point in time of switching over into the non-actuated state can thus be used as an initial value for an estimation of the pressure after the switching over. The model can accordingly describe the properties of the control valve device in the non-actuated state in particular with regard to a pressure equalization between input and output. The monitor can be implemented for the purpose, based on activation data and the model, of calculating and/or determining a state and/or a switch setting of the control valve device. It can be provided that the monitor is implemented for the purpose, based on the activation data and/or the pressure data and the model, of ascertaining a pressure distribution inside the control valve device and/or between connections in the control valve device, in particular between a fluid outlet of the control valve device and an output of the control valve device which is connected to the brake actuator in a fluid-conducting manner. In general, the activation data can be provided by a control device, which is implemented to activate the control valve device. Pressure data can be provided in particular by a sensor device for registering pressure values and/or by a control device and/or a further monitor for estimating a pressure, which is represented by the pressure data. The control valve device can be connected downstream of a main control valve device, which is capable of providing a main brake pressure for actuating the brake actuator. Of course, the brake device can comprise multiple brake actuators, which can be supplied with a shared main brake pressure by the main control valve device. The control valve device can be implemented in particular for the purpose of individually modifying, in particular decreasing and/or increasing, a main brake pressure provided by a main control valve device for a brake actuator. It is conceivable that the monitor is implemented for the purpose of carrying out the estimation during braking and/or a wheel slide protection measure. The control valve device can be implemented in such a manner that, in a non-actuated state, it connects the brake actuator to a region upstream of the control valve device, which can be supplied with a brake pressure via a main control valve device. In this state, which can correspond to the above-mentioned first switch setting, the main brake pressure provided by the main control valve device can correspond to the actuator pressure applied to the brake actuator. It can be provided that the control valve device, in an actuated state, which can correspond to the above-described second switch setting, connects the brake actuator to a fluid outlet, which supplies a brake fluid such as a hydraulic liquid or a gas to a reservoir and/or an outside region of the brake device such as the atmosphere. The connection of a fluid outlet to the atmosphere is expedient in particular for pneumatic brake devices. An activation of the control valve device can be provided in particular for switching over the control valve device between a first and a second switch setting and/or between an actuated and a non-actuated state. The pressure data can also represent multiple different pressures.

The control valve device can be the valve device of a wheel slide protection device. Such a wheel slide protection device can be implemented for the purpose of reducing an actuator pressure as a wheel slide protection measure in such a manner that it is less than a main brake pressure provided by a main control valve device. This can be expedient in particular if, in the case of a wheel braked by the brake actuator, slipping or blocking is established. In particular, the wheel slide protection device can be implemented for the purpose of reducing the pressure in the brake actuator to carry out a wheel slide protection measure, by interrupting the connection of the brake actuator to a pressurized region upstream of the control valve device and establishing a connection between the brake actuator and the atmosphere or a reservoir. For this purpose, the control valve device can accordingly be switchable into the second switch setting. The wheel slide protection device can have a control device such as a regulator or a wheel slide protection computer, which is capable of registering a sliding state of a wheel and activating a wheel slide protection measure.

The brake device can be a pneumatic or hydraulic brake device. In particular, the brake actuator can be pneumatically or hydraulically actuatable.

It can be provided that the pressure data represent a pilot control pressure. The pilot control pressure can be convertible in particular by a main control valve device into a main brake pressure. Such a pilot control pressure can be referred to as a pilot control brake pressure. In the event of known properties of the brake device, an initial value for an estimation of the actuator pressure can be ascertained from a pilot control pressure.

Alternatively or additionally, it is conceivable that the pressure data represent an input pressure applied to an input of the control valve device. Such an input pressure corresponds quite precisely, in the event of non-actuated control valve device, to the output pressure and therefore to the actuator pressure, and can therefore be used well as an initial value. Such a pressure can be a main brake pressure, for example. A main brake pressure can be able to be provided by a main control valve device in accordance with a braking request, for example. In this case, the main control valve device can be implemented for the purpose of converting a pilot control pressure or pilot control brake pressure into a main brake pressure. An input of the control valve device can be connected or connectable in a fluid-conducting manner to the main control valve device. An input pressure sensor or a main brake pressure sensor can be provided for registering the input pressure or main brake pressure. Alternatively or additionally, the input pressure can be estimated by a suitable input pressure monitor. Such an input pressure monitor can be implemented, for example, as a main brake pressure monitor. An input pressure monitor or a main brake pressure monitor can be implemented for the purpose, for example, of estimating the input brake pressure or the main brake pressure based on pressure data, which represent a pilot control pressure such as a pilot control brake pressure, and/or brake data representing a brake setpoint value and/or load data representing a load of the railway vehicle. It is conceivable that an input pressure monitor is implemented in the same control device as the monitor for estimating the actuator pressure.

The activation data can represent signals for activating the control valve device. Such signals can be electrical signals in particular, which may easily be branched off and/or copied for further processing by the monitor in the event of an activation of the control valve device.

It can be provided that the monitor is implemented as part of a control device, which is capable of activating the brake device based on the estimation of the brake pressure applied to the brake actuator. Therefore, the estimation can be used during the activation, which enables improved control of the brake device during braking. In this case, a monitor which is connected or connectable to a control device for data transmission, can be considered to be part of the control device.

Disclosed embodiments relate to a brake device for a railway vehicle having a monitor described herein. The brake device can comprise at least one pressure-actuated brake actuator. Furthermore, the brake device can comprise one or more brakes actuatable by the brake actuator, for example, disk brakes and/or block brakes and/or combined block-disk brakes. The brake device can be in particular a friction brake device for braking one or more wheels and/or one or more wheel axles. It is conceivable that the brake device has one or more control devices and/or sensor devices and/or a wheel slide protection device.

In addition, the disclosed embodiments relate to a railway vehicle having a brake device described herein and/or a monitor described herein.

In addition, according to the disclosed embodiments, a method for estimating an actuator pressure applied to a pressure-actuated brake actuator of a brake device of a railway vehicle is described. The method comprises the steps of registration, by a monitor, of pressure data, which represent at least one pressure present upstream of a control valve device of the brake device, registration, by the monitor, of activation data, which represent an activation of the valve device, and estimation, by the monitor, of the actuator pressure applied to the brake actuator based on the pressure data and the activation data. In this case, the control valve device is connected upstream of the brake actuator. The brake device can be a brake device described herein. It is conceivable that the monitor is a monitor described herein. The control valve device can be a valve device of a wheel slide protection device. The brake device can expediently be a pneumatic or hydraulic brake device. It is conceivable that the pressure data represent a pilot control pressure. Alternatively or additionally, the pressure data can represent a pressure applied to an input of the control valve device. The activation data can represent signals for activating the control valve device. It can be expedient if a control device activates the brake device based on the estimation of the actuator pressure applied to the brake actuator.

Figure 2:
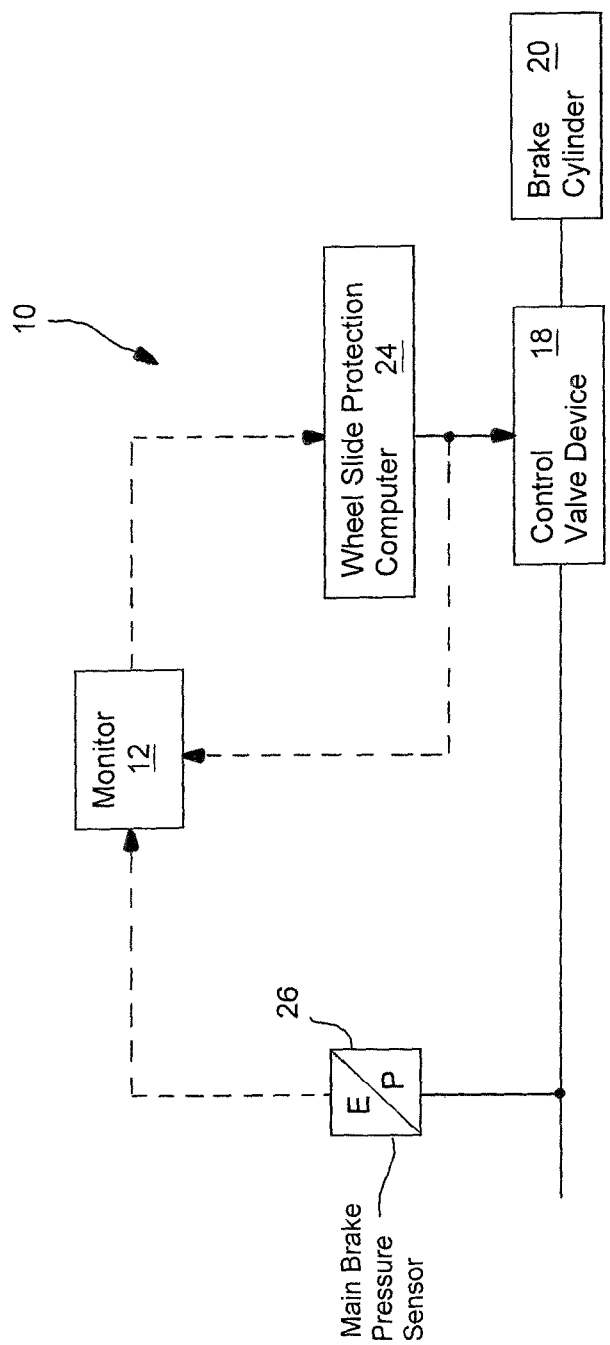
FIG. 2 schematically shows a further example of a brake device having a monitor.
Figure 3:
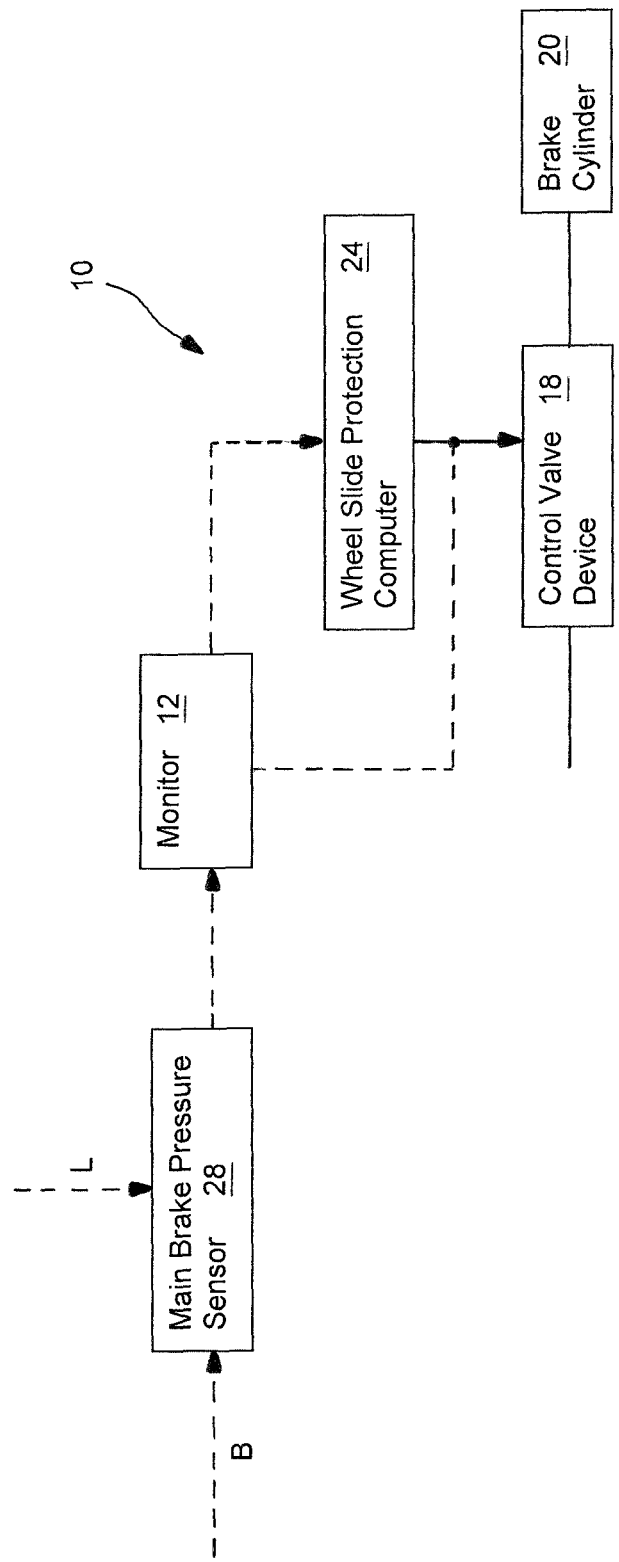
FIG. 3 schematically shows still another example of a brake device having a monitor.

In the following figures, identical reference signs identify identical or functionally similar components. In FIGS. 1 to 3, fluid-conducting connections are shown using solid lines, while connections for electromagnetic data transmission are shown by dashed lines. Such connections can be, for example, wire-bound or cable-bound connections and/or wireless connections.

FIG. 1 schematically shows an example of a brake device 10 of a railway vehicle having a monitor 12, which is implemented for estimating an actuator pressure. The monitor 12 can be a control device. The monitor 12 is connected to various components of the brake device 10 and can be considered to be part of the brake device 10. The brake device 10 comprises, in addition to the monitor 12, a pressure regulator 14. The pressure regulator 14 is connected to a pressure reservoir and is implemented for the purpose of providing a pilot control brake pressure in accordance with a control device. In this example, the pressure regulator 14 is activated by the control device, in which the monitor 12 is also implemented. The control device controls the pressure regulator in accordance with a braking request. The pressure regulator 14 provides the pilot control brake pressure to a relay valve 16 connected downstream therefrom. The relay valve 16 acts in this example as a pressure converter and converts the pilot control brake pressure to a greater fluid volume. In general, a pressure booster can also be provided, which is capable of increasing the pilot control brake pressure. The relay valve 16 therefore provides a main brake pressure, which can be used for actuating the brake device. The pressure regulator 14 and the relay valve 16 can be implemented as or considered to be parts of a main control valve device in this example, which is capable of providing a main brake pressure in accordance with a braking request. The main brake pressure is guided from the relay valve 16 to a control valve device 18. In this example, a brake cylinder 20 acting as a brake actuator is provided downstream of the control valve device 18. The brake cylinder 20 is connected to an output of the control valve device 18, while the input of the control valve device 18 is connected in a fluid-conducting manner to an output of the relay valve 16, which provides the main brake pressure. The control valve device 18 can furthermore have a fluid outlet. In this example, it is provided that the brake device 10 is a pneumatic brake device, which is capable of providing a pneumatic pressure via the pressure regulator 14, the relay valve 16, and the control valve device 18 to the brake cylinder 20. If a pressure is applied to the brake cylinder 20, the associated brake (not shown) is actuated in accordance with the applied pressure. The pressure acting on the brake actuator or brake cylinder 20 can be referred to as the actuator pressure. In the variant shown in FIG. 1, the control valve device 18 is implemented as a regulating valve or control valve of a wheel slide protection device. A pilot control brake pressure sensor 22 is connected between the pressure regulator 14 and the relay valve 16, which is capable of registering the pilot control brake pressure and transmitting pressure data representing this pressure as electrical signals to the monitor 12. In addition, a wheel slide protection computer 24 is provided, which is capable of activating the control valve device 18. The wheel slide protection computer 24 can be implemented in this case as an electronic control device, which is connected to suitable sensors, to provide a wheel slide protection function. For this purpose, the wheel slide protection computer 24 can be connected to wheel speed sensors, for example, to determine a sliding state or blocking state of a wheel associated with the brake cylinder 20. The wheel slide protection computer 24 is capable of activating the control valve device 18 to set the actuator pressure. Furthermore, a data-transmitting connection is provided, via which signals provided by the wheel slide protection computer 24 for activating the control valve device 18 can also be supplied to the monitor 12 as activation data. The relay valve 16 can be connected as shown in FIG. 1 to the same pressure source as the pressure regulator 14, or to a separate pressure source. During braking, the pressure regulator 14 converts a braking request in accordance with the control device into a pilot control brake pressure. The pilot control brake pressure is registered via the pilot control brake pressure sensor 22 and transmitted as pressure data, which represent the pilot control brake pressure, to the monitor 12. The relay valve 16 converts the pilot control brake pressure into a main control brake pressure. It is to be presumed that the conversion of the pilot control brake pressure into a main control brake pressure is performed in a defined pressure ratio, so that the main brake pressure can be concluded from the pilot control brake pressure. For example, a conversion ratio of 1 to 1 can be provided, if no pressure boosting is performed. The main brake pressure provided by the relay valve 16 is applied to the input of the control valve device 18. If the control valve device 18 is non-actuated, it assumes a state in which its input and its output are connected to one another. Therefore, the main brake pressure is relayed by the control valve device 18 to the brake cylinder 20 and acts therein as the actuator pressure for actuating the brake cylinder 20, whereby the friction brake connected to the brake cylinder 20 is actuated. During the braking, the wheel slide protection computer 24 monitors whether an undesired sliding or blocking state of the braked wheel occurs. If this is the case, the wheel slide protection computer 24 activates the control valve device 18 for the purpose of reducing the actuator pressure. In this case, in this example, signals are transmitted from the wheel slide protection computer 24 to the control valve device 18, which actuate the control valve device 18 for the purpose of blocking its input connected to the relay valve 16 and establishing a connection between its outlet and the output connected to the brake cylinder 20. Therefore, the actuator pressure can be reduced via the outlet of the control valve device 18. In the example shown, the outlet is connected to the atmosphere. In particular for a hydraulic brake device, however, it can also be provided that the outlet is connected to a fluid reservoir, for example, for accommodating a hydraulic liquid. During an activation of the control valve device 18, to carry out such a wheel slide protection measure, the brake cylinder 20 is disconnected from the input of the control valve device 18. Therefore, the actuator pressure can no longer follow the main brake pressure, but rather is essentially dependent on its initial value at the beginning of the wheel slide protection measure and the flow properties and the activation of the control valve device 18. The signals for activating the control valve device 18 are also supplied to the monitor 12 as activation data. The monitor 12 is capable of calculating and/or estimating the actuator pressure based on the pressure data and the activation data. For this purpose, the monitor 12 can be implemented for the purpose of taking into consideration a model of the control valve device 18, which can describe in particular the flow conditions of a fluid during a wheel slide protection measure based on the initial value and the activation data. The model can be based on experimental and/or theoretical findings and/or on simulation data. The monitor 12 can be implemented for the purpose of calculating an estimated value for the actuator pressure for estimating the actuator pressure based on the activation data and the pressure data and optionally the model. It can be provided in particular that a measured value for the pilot control brake pressure is provided and/or used as an initial value for the estimation by the monitor 12. Therefore, if the properties of the control valve device 18 are known, a good estimation of the actuator pressure can be provided for the brake control.

FIG. 2 schematically shows a further example of a brake device 10. The construction of this brake device essentially corresponds to the construction of the brake device shown in FIG. 1, so that several components are not shown. Alternatively or additionally to the pilot control brake pressure sensor 22 of the variant shown in FIG. 1, the brake device 10 can comprise a main brake pressure sensor 26. The main brake pressure sensor 26 is implemented for the purpose of registering the main brake pressure downstream of the relay valve (not shown in this figure) and upstream of the control valve device 18 and transmitting pressure data, which represent the registered pressure value, to the monitor 12. The monitor 12 of FIG. 2 can therefore carry out an estimation of the actuator pressure in the brake cylinder 20 based on pressure data from the main brake pressure sensor 26, the activation data, and optionally pressure data from a pilot control brake pressure sensor 22. In this case, in particular the main brake pressure measured by the main brake pressure sensor 26 can be used as an initial value for the estimation.

FIG. 3 schematically shows a further variant of a brake device 10. The construction of this brake device essentially corresponds to the construction of the brake devices shown in FIGS. 1 and 2, so that several components are not shown. According to the variant shown in FIG. 3, it is provided that an input pressure applied to the control valve device 18 is to be estimated, in the example shown, therefore the main brake pressure. For this purpose, brake data B, which represent a brake setpoint value, and also load data L, which represent a load state, are supplied to a main brake pressure monitor 28. It can be provided that pressure data from a pilot control brake pressure sensor 22 are also supplied to the main brake pressure monitor 28. The main brake pressure monitor 28 can be implemented separately from the monitor 12 or can be implemented in a shared control device. It is conceivable that the main brake pressure monitor 28 is capable of accessing a model of the brake device and/or the vehicle, which describes in particular a braking characteristic of the vehicle. Based on the brake data, the load data, and optionally the pressure data, the main brake pressure monitor 28 is capable of calculating and therefore estimating the main brake pressure and the input pressure at the control valve device 28. The result of the estimation can be provided to the monitor 12 as corresponding pressure data and can be used as an initial value for estimating the actuator pressure, in particular during a phase in which the control valve device 18 disconnects the brake cylinder 20 from the main brake pressure. Based on the input pressure estimation, the monitor 12 is capable of estimating the actuator pressure. It is generally conceivable that such an input pressure estimation is carried out alone or in conjunction with a pilot control brake pressure sensor and/or a main brake pressure sensor. Therefore, multiple pressure data sources can be used, for example, the pilot control pressure sensor 22, the main brake pressure sensor 26, and the input pressure monitor 28, to enable an improved plausibility check and higher precision of the estimation of the actuator pressure.

Figure 4:
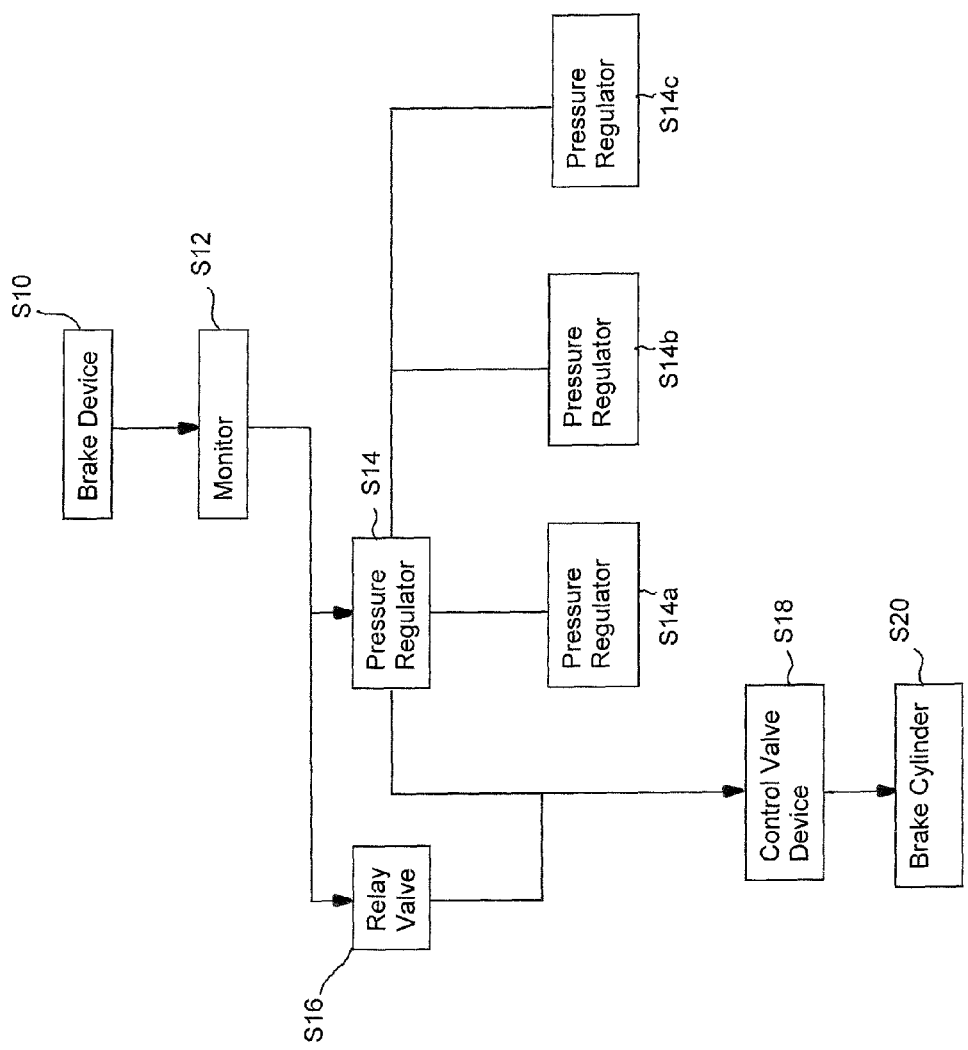
FIG. 4 schematically shows a chart of a method for estimating an actuator pressure.

FIG. 4 schematically shows a flow chart of a method for estimating an actuator pressure. The method can be carried out, for example, by a monitor described herein and/or a brake device described herein. In an optional step S10, a brake device can be activated for braking. For this purpose, for example, the conductor and/or a control device can activate a main control valve device of a pressure-actuated brake device to provide a main brake pressure. In an optional second step S12, which can be executed in addition to step S10, the activation of a control valve device arranged stream of a main control valve device can be performed. In this case, for example, an actuator pressure active in a brake actuator can be reduced. In a step S14, a monitor, for example, one of the monitors described in FIGS. 1 to 3, can receive pressure data. Step S14 can be carried out in parallel to at least one of steps S10 or S12, after one of these steps, or independently of these steps. It can be provided that pressure data are received from multiple data sources in step S14. Thus, for example, in a substep S14a of step S14, the monitor can receive pressure data from a pilot control brake pressure sensor. In a substep S14b, the monitor can receive pressure data from a main brake pressure sensor device, which can represent a main brake pressure. In a substep S14c, the monitor 12 can register and/or receive pressure data from an input pressure monitor. In parallel or in series to step S14, the monitor can register and/or receive activation signals of the control valve device, which can be considered to be activation data, in a step S16.

Based on the pressure data and the activation data and optionally a model of the control valve device, which can describe in particular the flow properties of the control valve device based on its activation and the pressures at the output, input, and outlet, the monitor can calculate and estimate the actuator pressure of the brake actuator in a following step S18. Step S18 can also be carried out in this case in parallel to steps S14 and/or S16 of the registration of pressure data and activation data, as soon as corresponding data for the estimation are present. This enables a continuous update of the estimation. A value for the actuator pressure can be provided reliably by the estimation, which can enable an improved activation of the further braking operation in particular when the activation of the control valve device is canceled out, for example, because a wheel slide protection measure is ended. For this purpose, in particular a step S20 can be provided, in which an activation of the brake is carried out based on the estimation.

The features of the invention disclosed in the above description, in the drawings, and in the claims can be essential for implementing the invention both individually and also in any arbitrary combination.

LIST OF REFERENCE NUMERALS 10 brake device
12 monitor
14 pressure regulator
16 relay valve
18 control valve device
20 brake cylinder
22 pilot control brake pressure sensor
24 wheel slide protection computer
26 main brake pressure sensor
28 main brake pressure monitor

The invention claimed is:

1. A monitor for a brake device of a railway vehicle, wherein the brake device comprises at least one pressure-actuated brake actuator, from which a control valve device is connected upstream, wherein the monitor receives pressure data and activation data estimates the actuator pressure applied to the brake actuator based on the pressure data and activation data, wherein the pressure data represent at least one pressure present upstream of the control valve device and the activation data represent an activation of the control valve device.

2. The monitor of claim 1, wherein the control valve device is a valve device of a wheel slide protection device.

3. The monitor of claim 1, wherein the brake device is a pneumatic or hydraulic brake device.

4. The monitor of claim 1, wherein the pressure data represent a pilot control pressure.

5. The monitor of claim 1, wherein the pressure data represent an input pressure applied to an input of the control valve device.

6. The monitor of claim 1, wherein the activation data represent signals for activating the control valve device.

7. The monitor of claim 1, wherein the monitor is implemented as part of a control device, that activates the brake device based on the estimation of the actuator pressure applied to the brake actuator.

8. A brake device for a railway vehicle having a monitor as claimed in claim 1.

9. A railway vehicle having a brake device as claimed in claim 8.

10. A method for estimating an actuator pressure applied to a pressure-actuated brake actuator of a brake device of a railway vehicle, the method comprising:
registration, by a monitor, of pressure data, which represent at least one pressure present upstream of a control valve device of the brake device, wherein the control valve device is connected upstream of the brake actuator;
registration, by the monitor, of activation data, which represent an activation of the control valve device; and
estimation, by the monitor, of the actuator pressure applied to the brake actuator based on the registered pressure data and the activation data.

* * * * *